United States Patent
Lengning et al.

(10) Patent No.: US 7,482,911 B2
(45) Date of Patent: Jan. 27, 2009

(54) PROCESS FOR THE OUTPUT OF INFORMATION IN A VEHICLE

(75) Inventors: Marc Lengning, Munich (DE); Bernhard Schambeck, Menlo Park, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 701 days.

(21) Appl. No.: 11/076,303

(22) Filed: Mar. 10, 2005

(65) Prior Publication Data

US 2005/0216136 A1 Sep. 29, 2005

Related U.S. Application Data

(60) Provisional application No. 60/551,800, filed on Mar. 11, 2004.

(51) Int. Cl.
*B60Q 1/00* (2006.01)

(52) U.S. Cl. .................. 340/439; 340/575; 340/576; 701/29; 701/33; 701/34; 702/182; 702/183; 702/188

(58) Field of Classification Search ........... 340/439, 340/575, 576; 702/182, 183, 188, 186; 701/29, 701/33, 34
See application file for complete search history.

(56) References Cited

U.S. PATENT DOCUMENTS

| | | | |
|---|---|---|---|
| 6,239,707 B1 * | 5/2001 | Park ........................ 340/576 |
| 6,313,749 B1 * | 11/2001 | Horne et al. ............. 340/575 |
| 6,925,425 B2 * | 8/2005 | Remboski et al. ........ 702/188 |
| 2005/0143884 A1 * | 6/2005 | Bihler et al. ............. 701/36 |

FOREIGN PATENT DOCUMENTS

DE 101 53 987 A1 5/2003

* cited by examiner

*Primary Examiner*—Tai T Nguyen
(74) *Attorney, Agent, or Firm*—Crowell & Moring LLP

(57) ABSTRACT

In the case of a process for the output of information in a vehicle, an information source is used for the output of information which is generated as a function of the driver's behavior. The driver's behavior is determined on the basis of data of one or more driving systems and/or of one or more comfort systems of the vehicle. According to the invention, the nature of the information depends on the driver's driving behavior. It describes the next useful behavior step following the momentary behavior.

12 Claims, 2 Drawing Sheets

US 7,482,911 B2

PROCESS FOR THE OUTPUT OF INFORMATION IN A VEHICLE

CROSS REFERENCE

The present application claims the benefit of priority under 35 U.S.C. § 119 to U.S. Provisional Patent Application No. 60/551,800, filed Mar. 11, 2004. The application is related to U.S. Applications entitled PROCESS FOR THE OUTPUT OF INFORMATION IN A VEHICLE and PROCESS AND APPARATUS FOR THE OUTPUT OF MUSIC INFORMATION IN A VEHICLE filed on even date herewith.

BACKGROUND AND SUMMARY OF THE INVENTION

The invention relates to a process for the output of information in a vehicle, having an information source for the output of information which is generated as function of the driver's behavior, and in the case of which the driver's behavior is determined via data of one or more driving systems and/or one or more comfort systems of the vehicle. The term "information" applies mainly to acoustic and/or visual information. However, it may also apply to other types of information, such as tactile information.

A process of the above-mentioned type is known from German Patent Document DE 101 53 987 A1, the specification of which is incorporated by reference herein as non-essential matter. In this case, information, which is generated as a function of the driver's behavior (the driver's behavior being determined via data from one or more driving systems and/or from one or more comfort systems of the vehicle) is emitted at a frequency which is influenced by the driver's condition and/or by the driver's behavior. Thus, a type of feedback concerning the driver's condition and/or the driver's behavior is provided to the information source with the goal of changing their sensitivity. The information system carries out the analysis of driver-condition-relevant or driver-behavior-relevant data already present in the vehicle, and controls the frequency of the information output as a function of these data.

With respect to the above, one aspect of the invention is to improve the useful value of the information output for the driver.

The invention provides a process for the output of information in a vehicle having an information source for the output of information which is generated as function of the driver's behavior, and in the case of which the driver's behavior is determined via data of one or more driving systems and/or one or more comfort systems of the vehicle. The quality or nature of the information depends on the driver's driving behavior and describes the next useful behavior step following the momentary behavior.

One aspect of the invention is to provide assistance to the driver for influencing his further behavior. For this purpose, the next useful behavior step is described, which follows the driver's momentary behavior.

The basic idea of the invention will be explained by means of an example.

It is assumed that the driver begins driving at low ambient temperatures and while the vehicle is cold. After the starting the drive, the driver receives, preferably, acoustic information concerning possible measures for improving comfort, for example, the following acoustic content:

"Switch on seat heater."

This information is undoubtedly valuable to the driver and contributes to increasing his comfort. The driver receives information concerning measures he can take in the respective driving and usage situation even if they are not absolutely necessary.

On the other hand, it is information is which the driver does not receive in the case of conventional warning systems and other information systems. Conventional safety systems, such as a wheel slip system, are activated only when certain physical limits have been reached or exceeded. In the present case, such systems and the pertaining visual and/or acoustic information systems remain inactive.

In addition, the value of the currently effective information can be recognized. It thereby becomes possible to provide the driver with real assistance without simultaneously forcing him to act. This illustrates the difference with respect to the acoustic or visual information which is emitted in the case of a navigation system. There, the output of the information takes place as a function of the route covered so far. In addition, such information is expected by the driver. Also, the information does not have the purpose of being understood, as in the case of the invention, as an unexpected offer of a possible alternative action, but rather as a concrete instruction for a specific action or path to be taken.

Advantageous developments and further developments are described and claimed herein. They can be assigned to various scenarios during the use of the vehicle.

Other objects, advantages and novel features of the present invention will become apparent from the following detailed description of the invention when considered in conjunction with the accompanying drawings.

DETAILED DESCRIPTION OF THE DRAWINGS

Thus, the information can be targeted at the startup sequence of the vehicle. In addition to the given information concerning the possibility of switching on the seat heater, the prompt to start the engine can also be presented after the seat belt was buckled on occupied seats.

The information can also be aimed at the shut down sequence during the termination of the driving operation. When the driver opens the vehicle door after turning off the engine, he may receive the informative indication that a window is still open. He can close the window before leaving the vehicle and is, for example, not forced to reactivate the vehicle electric system in order to be able to operate the electrical window lift mechanism.

In addition, the information can be aimed at calming a driver. When the driver carries out abrupt steering movements, a suitable indication can be emitted with the goal of reducing the unusual stress on the driver, which stress can be recognized from his driving behavior.

Figure 1:
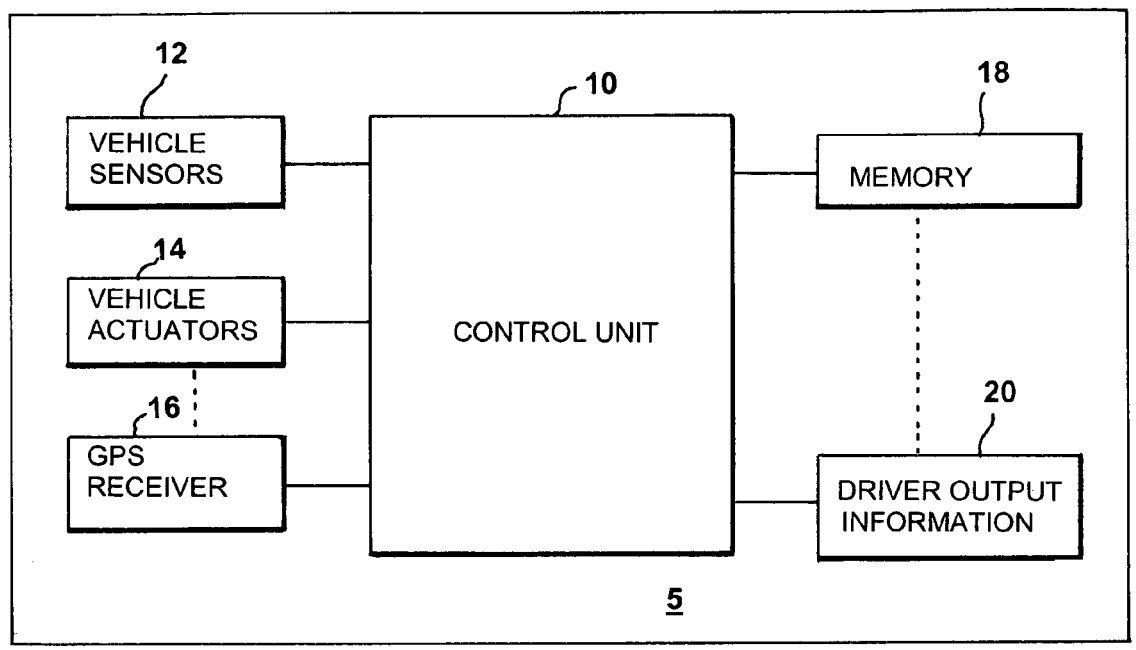
FIG. 1 is a schematic block diagram illustrating an exemplary apparatus for outputting information in a vehicle in accordance with the present invention.

A technical implementation of the invention for an acoustic information output takes place as follows, with reference to FIG. 1 for example.

An assigned control unit 10 analyzes the respective driving situation and the driver's behavior using the information of the vehicle sensors 12 and actuators 14, which information is situated on the databus inside the vehicle 5. When one of the provided driving situations is detected in a limit range for dynamics or drive assembly power, the acoustic information and/or graphics provided for this purpose are read out of an onboard voice memory 18 and are announced by way of the loudspeakers of the audio system and/or by way of a monitor 20.

The data, including possible GPS information 16, stored on the databus, can be used as input data of the system. The system can be configurable; the contents (audio files and graphics files) are stored, as mentioned above, in the vehicle by way of a memory medium (memory card, hard disc, or the like). However, it is also contemplated to download the contents via the Internet or purchase them at a vehicle dealer.

Figure 2:
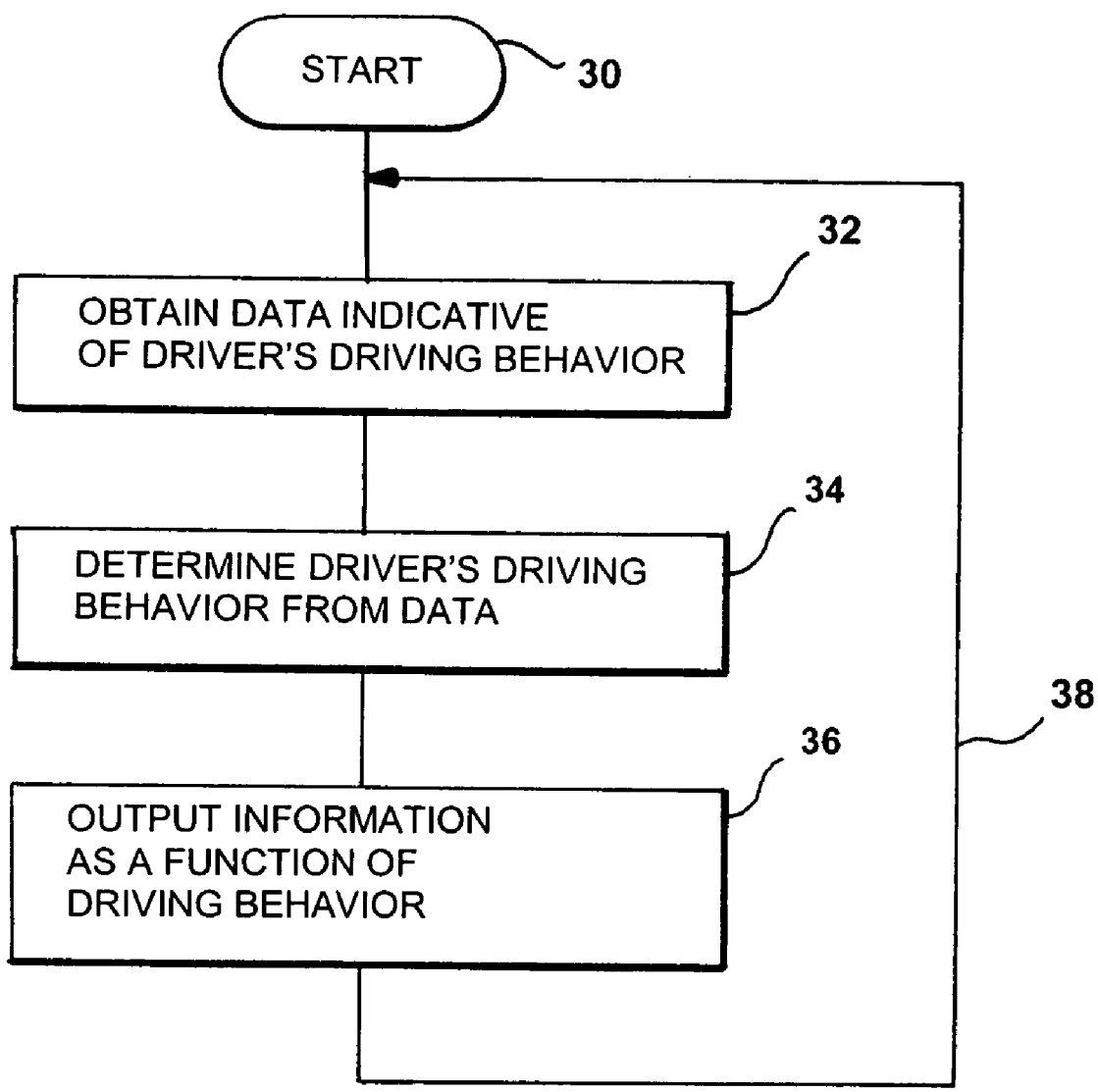
FIG. 2 is a flowchart of an exemplary process for outputting information in a vehicle in accordance with the present invention.

FIG. 2 illustrates an exemplary process for outputting information in the vehicle. The process begins at step 30 and then proceeds by obtaining data indicative of a driver's driving behavior, such as from the vehicle sensors and actuators or the like (step 32). The process then determines the driver's driving behavior based on the data obtained (step 34). At step 36, the process outputs information whose nature depends on the determined driving behavior of the driver. The information describes the next useful behavioral step that may be taken by a driver following the momentary behavior that is occurring. The process may continually repeat itself as illustrated by loop 30A.

Another implementation of the invention takes place in that helpful information is provided, for example, also when the driver refuels his car. The refueling operation can be detected by the vehicle sensor system, for example, on the basis of a significant rise in the fuel quantity when the vehicle is standing still. On such an occasion, it may be recommended to the driver to refill the oil, washer fluid, or the like. This may previously take place when it is detected with a corresponding sensor system that a critical storage quantity is very close to being reached. In such a case, a warning indication would not otherwise yet be active. After a further consumption of the monitored quantity, such as would occur after the driver drives away from the gas station, he would, without the invention, surprisingly and annoyingly receive information to refill the storage quantity. By means of the invention, the driver will receive such information to refill the storage quantity (e.g., fuel) when the quantity is still readily available in the gas station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A process for an output of information via an information source in a vehicle, which information is generated as a function of a driver's behavior, the process comprising the acts of:
    obtaining data from at least one of one or more driving systems and one or more comfort systems of the vehicle;
    determining the driver's momentary behavior based on said data; and
    outputting information which describes a next useful action that follows the momentary behavior and would be more convenient for the driver to perform in connection with the momentary behavior.

2. The process according to claim 1, wherein the information is targeted at a sequence occurring during start-up of the vehicle.

3. The process according to claim 1, wherein the information is targeted at a sequence occurring during termination of a driving operation.

4. The process according to claim 2, wherein the information is additionally targeted at a sequence occurring during termination of a driving operation.

5. The process according to claim 2, wherein the information is additionally targeted toward calming the driver.

6. The process according to claim 3, wherein the information is additionally targeted toward calming the driver.

7. The process according to claim 4, wherein the information is additionally targeted toward calming the driver.

8. The process of claim 1, wherein obtaining the data comprises obtaining the data from a first set of vehicle systems, wherein the first set of vehicle systems includes the at least one of one or more driving systems and one or more comfort systems of the vehicle.

9. The process of claim 8, wherein the next useful action corresponds to at least one additional vehicle system that is not within the first set of vehicle systems used for obtaining the data.

10. The process of claim 1, further comprising, prior to said outputting, determining the next useful action based solely on a determination that it would be more convenient for the driver to perform the next useful in connection with the momentary behavior than at other times.

11. The process of claim 1, wherein the next useful action corresponds to a vehicle warning indication that has not yet been activated.

12. The process of claim 11, wherein the vehicle warning indication corresponds to a vehicle sensor.

* * * * *